United States Patent Office 2,967,165
Patented Jan. 3, 1961

2,967,165

LEATHER IMPREGNITE

Milton Bailey, 36 Kenilworth Place, Brooklyn, N.Y.

No Drawing. Filed Oct. 14, 1958, Ser. No. 767,240

10 Claims. (Cl. 260—23)

(Granted under Title 35, U.S. Code (1952), sec. 266)

The invention described herein may be manufactured and used by or for the Government of the United States of America for governmental purposes without the payment of any royalties thereon or therefor.

This invention relates generally to compositions of matter to be used as leather impregnites, and particularly as shoe impregnites, for rendering leather, and particularly shoes, resistant to penetration by corrosive acids, and to chemical warfare vesicant agents such as mustard gas, lewisite, and the like. An auxiliary purpose is to provide a stuffing material for leather, particularly shoes, adapted to enhance its resistance to water and to increase its durability.

Mustard gas and lewisite are persistent vesicant agents which remain in liquid form for long periods of time. These and like vesicants are capable of penetrating shoe leather so as to cause severe blistering of the feet within short periods of time. Accordingly, it is necessary that personnel required to pass over areas contaminated with such vesicants be equipped with shoes that have been suitably treated so as to give protection against these agents. It is also desirable to maintain or to improve resistivity to attack of shoe leather by water, and to increase durability, while solving the principal problem.

In Averill et al., U.S. Patent No. 2,719,794, a composition of 40 parts by weight of ester gum, 40 parts by weight of paraffin and 20 parts by weight of neat's-foot oil is employed. Such material, however, is subject to disadvantages: it is not resistant to corrosive acids, and it contains no agent capable of neutralizing vesicants.

In prior art techniques of impregnation of leather with rubber, it has been practice to dissolve Butyl rubber and Vistanex LM type in petroleum solvents, such as Stoddard solution or Varsol, or in chlorinated solvents, and then to immerse the crusted sole leather in solution for several hours. Thereafter, the drying and finishing techniques were applied. This method is subject to a number of disadvantages. Vistanex or Butyl rubber must be dissolved in either chlorinated or petroleum solvents, which evaporate from the leather. Petroleum solvents are inflammable, while chlorinated solvents are highly toxic. The evaporation of solvents during the process increases costs materially, and practice of the method requires extensive, costly capital equipment. In addition, a high molecular weight Vistanex such as B–80 (a rubbery solid polyisobutylene having a molecular weight of about 80,000) cannot be impregnated readily into leather by the solvent method.

The foregoing disadvantages of past impregnites and leather treating techniques are substantially overcome by this shoe impregnite and leather stuffing compound, which is stable to concentrated nitric acid and, generally, resists corrosive acids and protects and lubricates the leather. Further, it mixes readily with dry calcium hypochlorite, holds available chlorine, and provides a composition that can neutralize vesicants as well as resist their penetration through shoe leather.

The principal object of this invention is to provide a shoe and leather impregnite and stuffing compound.

Another object is to provide a composition of matter for the treatment of leather to render it resistant to penetration by acids and vesicants, and adapted to provide a stuffing compound for sole leather.

A further object is to provide a method of impregnating leather.

Other objects and many of the attendant advantages of this invention will be readily appreciated as the same becomes better understood by reference to the following detailed description.

The composition of the subject invention comprises about 26 parts by weight of B–80 Vistanex, about 44 parts by weight of paraffin wax, about 15 parts by weight of paraffin oil, and about 15 parts by weight of neat's-foot oil. In preparation of the compound, the Vistanex is milled together with the paraffin wax at 150° to 200° F. and melted at 300° to 350° F. Paraffin oil is added to the hot mixture as heating is continued. Finally, the neat's-foot oil is added, the mixture is stirred until a homogeneous mass is provided (by stirring for a period of the order of several minutes) and the mixture is allowed to cool. The resulting compound is a stable, inert material having a gummy consistency at average ambient temperatures.

When used as an impregnant against vesicants, about 10 to 20 parts by weight of dry calcium hypochlorite can be stirred into the gummy mixture.

The compound described above is stable to concentrated nitric acid. When smeared on calf leather to a thickness of 5 mils, the coated leather resists corrosive acids, the coating protecting and lubricating the leather. The compound mixes readily with dry calcium hypochlorite, holds available chlorine, and provides a composition that can neutralize vesicants as well as resist their penetration through shoe leather.

As a leather stuffing material, results exceeding prior Vistanex solvent technology have been achieved using the following approximated proportions of constituents:

(a) Crusted sole leather stuffed with a blend of 26% B–80 Vistanex, 44% paraffin wax, 15% paraffin oil and 15% neat's-foot oil absorbed 35% of the mixture, resisted abrasion 69% better than standard sole leather, and absorbed only 5% water after overnight immersion.

(b) Crusted sole leather stuffed with a blend of 22.2% B–80 Vistanex, 22.2% paraffin wax, 22.2% polypale resin, 22.2% paraffin oil and 11.2% neat's-foot oil absorbed 26% of the mixture, resisted abrasion 48.7% better than standard sole leather, and picked up 11.4% water after overnight immersion.

(c) Crusted sole leather stuffed with 21% B–80 Vistanex, 21% paraffin wax, 10.6% polyethylene (Epolene N, a polyethylene wax of molecular weight ranging from 2,500 to 3,000 with a melting point of approximately 223° F. and a Brookfield viscosity of 2,200 to 2,700 centipoises at 250° F., manufactured by the Eastman Chemical Products Company of Kingsport, Tenn., 36.8% paraffin oil and 10.6% neat's-foot oil absorbed 28.4% of the stuffing mixture, resisted abrasion 58% better than standard leather, and picked up 10.6% water after overnight immersion.

In using the stuffing compounds, better water resistance is achieved, all of the ingredients of the compound are integrated into the leather, and encumbering of the process by solvent waste, inflammability, toxicity or additional equipment is avoided.

As a leather stuffing material or impregnant, the entire compound is absorbed by the leather. The neat's-foot and paraffin oils foster lubricity, and the paraffin wax and Vistanex enhance abrasion resistance, while no ingredient materially inhibits the effectiveness of any other ingredient. In addition, the compound impedes or inhibits the absorption of petroleum solvents and oils into the leather.

The B–80, which is a relatively high molecular weight Vistanex, is carried into the leather easily by the subject method. While the composition melts at approximately 120° F., the melting point can be raised by the addition of B–80 Vistanex.

When used as a vesicant retardant, the impregnite can be smeared or dubbed on a shoe, by hand. For impregnation of leather to increase wear and to enhance oil and water resistance, the composition is placed in a drum and heated to approximately 140° to 155° F. The quantity of the composition, preferably, is about 25 parts by weight admixed with 75 parts by weight of damp leather stock, which is placed in the drum and tumbled until the composition is absorbed completely by the leather.

The proportion of B–80 Vistanex in the composition can be increased in order to increase the melting point and to decrease the flow characteristics of the mixture inside the leather. The addition of rosins to the mixture will stiffen sole leather. Low melting polyethylene waxes can be added to the mixture to further enhance oil and petroleum solvent repellant characteristics especially desirable in work glove, industrial shoe, and mechanical leathers.

In use as a stuffing compound, equivalents of Vistanex are Butyl rubber and polybutene. The following approximated proportions of constituents have been employed:

(*a*) Crusted sole leather stuffed with a blend of 44.4% polybutene having a molecular weight of about 1500, 44.4% paraffin and 11.2% Polypale (a light colored resin produced by the polymerization of rosin—manufactured by the Hercules Powder Company of Wilmington, Del.) substantially increased resistane to abrasion and reduced water absorption, as milling the polybutene and paraffin and then melting the milled mixture (as in the Vistanex mixtures above described) provides a solution for the hot melt dip of leather, the leather immersed therein picking up 40.4% solids at 142° F.

(*b*) Crusted sole leather stuffed with a blend of 16⅔% Butyl (a copolymer of isobutylene and isoprene) having a molecular weight of about 45,000, 16⅔% paraffin, 33⅓% mineral oil and 33⅓% Stoddard solvent substantially increased resistance to abrasion and reduced water absorption: milling the Butyl and paraffin, and then melting the milled mixture (as in the Vistanex mixture above described) provides a solution for the hot melt dip of leather, the leather immersed therein picking up 26% solids.

Obviously many modifications and variations of the present invention are possible in the light of the above teachings. It is therefore to be understood that within the scope of the appended claims the invention may be practiced than as specifically described.

I claim:

1. A composition of matter for treatment of leather to render it resistant to penetration by mustard gas, lewisite and like vesicants which comprises about 21 to 26 parts by weight of a polyisobutylene having a molecular weight of about 80,000, about 21 to 44 parts by weight of paraffin wax, about 36.8 to 15 parts by weight of paraffin oil, and about 10.6 to 15 parts by weight of neat's-foot oil.

2. A composition of matter for treatmet of leather to render it resistant to penetration by mustard gas, lewisite and like vesicants which comprises about 21 to 26 parts by weight of a polyisobutylene having a molecular weight of about 80,000, about 21 to 44 parts by weight of paraffin wax, about 36.8 to 15 parts by weight of paraffin oil, and about 10.6 to 15 parts by weight of neat's-foot oil, said composition being admixed with 10.6 to 22.2 parts by weight of an additive of the class consisting of a polyethylene wax of molecular weight ranging from 2,500 to 3,000 with a melting point of approximately 223° F. and a Brookfield viscosity of 2,200 to 2,700 centipoises at 25° F., and a polymerized rosin.

3. A composition of matter for treatment of leather to render it resistant to penetration by mustard gas, lewisite and like vesicants which comprises about 26 parts by weight of a polyisobutylene having a molecular weight of about 80,000, about 44 parts by weight of paraffin wax, about 15 parts by weight of paraffin oil, and about 15 parts by weight of neat's-foot oil.

4. A composition of matter for treatment of leather to render it resistant to penetration by musard gas, lewisite and like vesicants which comprises about 26 parts by weight of a polyisobutylene having a molecular weight of about 80,000, about 44 parts by weight of paraffin wax, about 15 parts by weight of paraffin oil, and about 15 parts by weight of neat's-foot oil, said compound being admixed with about 10 to 30 parts by weight of dry calcium hypochlorite.

5. A composition of matter for treatment of leather to render it resistant to penetration by mustard gas, lewisite and like vesicants which comprises about 22.2 parts by weight of a polyisobutylene having a molecular weight of about 80,000, about 22.2 parts by weight of paraffin wax, about 22.2 parts by weight of polymerized rosin, about 22.2 parts by weight of paraffin oil, and about 11.2 parts by weight of neat's-foot oil.

6. A composition of matter for treatment of leather to render it resistant to penetration by mustard gas, lewisite and like vesicants which comprises about 21 parts by weight of a polyisobutylene having a molecular weight of about 80,000, about 21 parts by weight of paraffin wax, about 10.6 parts by weight of polyethylene, about 36.8 parts by weight of paraffin oil, and about 10.6 parts by weight of neat's-foot oil.

7. A composition of matter for treatment of leather to render it resistant to penetration by mustard gas, lewisite and like vesicants which comprises about 44.4 parts by weight of a polybutene having a molecular weight of about 1500, about 44.4 parts by weight of paraffin, and about 11.2 parts by weight of polymerized rosin.

8. A composition of matter for treatment of leather to render it resistant to penetration by mustard gas, lewisite and like vesicants which comprises about 16⅔ parts by weight of a copolymer of isobutylene and isoprene having a molecular weight of about 45,000, about 16⅔ parts by weight of paraffin, about 33⅓ parts by weight of mineral oil, and about 33⅓ parts by weight of Stoddard solvent.

9. The method of preparing a composition that penetrates into the body of the leather of a shoe for the protection of the shoe against abrasion and against the penetration therethrough of mustard gas, lewisite and like vesicants, which comprises heating a mixture of polyisobutylene, paraffin wax, paraffin oil and neat's-foot oil to a temperature of approximately 140° to 155° F., admixing 25 parts by weight of such mixture with 75 parts by weight of damp leather stock, and tumbling such mixture and leather stock until such mixture is absorbed by such leather stock.

10. A composition of matter for treatment of leather to render it resistant to penetration by mustard gas, lewisite and like vesicants which comprises a polymer of the class consisting of polybutene, a copolymer of isobutylene and isoprene, and polyisobutylene, admixed with polymerised rosin.

References Cited in the file of this patent

UNITED STATES PATENTS

| | | |
|---|---|---|
| 2,093,431 | Frolich | Sept. 21, 1937 |
| 2,628,187 | Frohmader et al. | Feb. 10, 1953 |
| 2,719,794 | Averill et al. | Oct. 4, 1955 |
| 2,775,561 | Frohmader | Dec. 25, 1956 |